(12) United States Patent
Huang et al.

(10) Patent No.: US 7,839,321 B2
(45) Date of Patent: Nov. 23, 2010

(54) RADAR CABLE DETECTION SYSTEM

(75) Inventors: Tom T. Huang, Wayne, NJ (US);
Samson Chu, Mountainside, NJ (US);
Yongsu B. Choe, Sparta, NJ (US);
Ronnie H. Kanagawa, Sunnyvale, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 127 days.

(21) Appl. No.: 12/311,501

(22) PCT Filed: May 29, 2008

(86) PCT No.: PCT/US2008/006896
§ 371 (c)(1),
(2), (4) Date: Apr. 1, 2009

(87) PCT Pub. No.: WO2008/147574
PCT Pub. Date: Dec. 4, 2008

(65) Prior Publication Data
US 2010/0214152 A1    Aug. 26, 2010

Related U.S. Application Data

(60) Provisional application No. 60/932,091, filed on May 29, 2007.

(51) Int. Cl.
*G01S 13/93* (2006.01)
*G01S 13/04* (2006.01)

(52) U.S. Cl. .................. 342/29; 342/159; 342/162; 342/120; 342/121; 342/27; 342/134; 342/145; 342/189

(58) Field of Classification Search .................. 342/29, 342/159–162, 120–122, 130–133, 134, 145, 342/148, 189, 21, 27
See application file for complete search history.

(56) References Cited

U.S. PATENT DOCUMENTS

| 3,390,271 | A | * | 6/1968 | Lavine | 356/29 |
| 4,737,788 | A | * | 4/1988 | Kennedy | 342/29 |
| 6,680,710 | B1 | | 1/2004 | Merenda | |

(Continued)

OTHER PUBLICATIONS

R. F. Harrington, et al, Straight Wires with Arbitrary Excitation and Loading. IEEE Trans. on Antennas and Propagation, vol. AP-15. No. 4 (Jul. 1967) at pp. 502-515.
K. Sarabandi, et al, A Radar Cross-Section Model for Power Lines at Millimeter-Wave Frequencies, IEEE Trans. on Antennas and Propagation, vol. 51, No. 9 (Sep. 2003), at pp. 2353-2360.
D. C. Griffith, Phase Error Compensation Technique for Improved Synthetic Aperture Radar Performance, Johns Hopkins APL Technical Digest, vol. 18, No. 3 (1997) at pp. 358-36.

(Continued)

*Primary Examiner*—John B Sotomayor
(74) *Attorney, Agent, or Firm*—Leo Zucker; Daniel J. Long

(57) ABSTRACT

Ground clutter is effectively separated from true signals echoed by a cable in the flight path of an aircraft, by encoding a transmitted pulse wave in a radar system with at least one transmit (TX) coding sequence, so that received signals echoed by the cable on which the pulse is incident and associated ground clutter are orthogonal or separable from one another. The TX coding sequence is altered into two receive (RX) coding sequences one of which corresponds to the cable and the other to the ground clutter. The two RX coding sequences are then correlated with the received signals, thereby separating the true signals echoed by the cable from the associated ground clutter.

15 Claims, 16 Drawing Sheets

U.S. PATENT DOCUMENTS

| | | | |
|---|---|---|---|
| 6,750,807 B1 | 6/2004 | Hager et al. | |
| 6,885,334 B1 | 4/2005 | Hager et al. | |
| 7,136,011 B2 | 11/2006 | Mork et al. | |
| 7,463,183 B2 * | 12/2008 | Reich | 342/29 |
| 7,479,920 B2 * | 1/2009 | Niv | 342/65 |
| 7,499,773 B2 * | 3/2009 | Pire et al. | 701/3 |
| 7,543,780 B1 * | 6/2009 | Marshall et al. | 244/194 |
| 7,633,429 B1 * | 12/2009 | Liu et al. | 342/33 |
| 7,672,758 B2 * | 3/2010 | Astruc | 701/16 |
| 2004/0178943 A1 * | 9/2004 | Niv | 342/29 |
| 2006/0009887 A1 | 1/2006 | Rubin et al. | |
| 2006/0025897 A1 | 2/2006 | Shostak et al. | |
| 2010/0214152 A1 * | 8/2010 | Huang et al. | 342/29 |

OTHER PUBLICATIONS

R. Losch, et al., On a Novel PN-Code Pulse Compression Technique in a Radar Application: Impacts of Non-ideal System Properties, IEEE Sixth Int. Sypm. on Spread-Spectrum Tech.

* cited by examiner

EXAMPLE - AIRCRAFT FLYING AT 2500 FEET

TRANSMIT PULSE 1
RECEIVED IN PLUSE 3 WINDOW
RESULTS IN FALSE DISTANCE
MEASUREMENT

ALGORITHM OF NF

1. SELECT SPAN $M$ FOR RUNNING MEDIAN SMOOTHER.

2. PROCESS THE ORIGINAL VECTOR $\rho_{XP}(k)$ WITH RUNNING MEDIAN SMOOTHER.

$Sm_k = \text{median}(\rho_{XP}(k-M+1), \rho_{XP}(k-M+2), \ldots, \rho_{XP}(k), \ldots, \rho_{XP}(k+M-2), \rho_{XP}(k+M-1)),$
$$k = M, M+1, \ldots, n-M+1$$

$Sm_2 = \text{median}(\rho_{XP}(1), \rho_{XP}(2), \rho_{XP}(3))$ $Sm_{n-1} = \text{median}(\rho_{XP}(n), \rho_{XP}(n-1), \rho_{XP}(n-2))$ $Sm_1 = \text{median}(\rho_{XP}(1), \rho_{XP}(2), \rho_{XP}(1) + \rho_{XP}(2) - \rho_{XP}(3))$ $Sm_n = \text{median}(\rho_{XP}(n), \rho_{XP}(n-1), \rho_{XP}(n) + \rho_{XP}(n-1) - \rho_{XP}(n-2))$ 3. TRANSFORM THE ORIGINAL CORRELATION VECTOR TO $D_k$.

$D_k = \rho_{XP}(k) - Sm_k$

FIG. 14

ALGORITHM OF TH

ALGORITHM TO TEST TRANSFORMED VECTOR FOR TARGET.

1. CHECK THE CURVATURE NEAR A POINT IN THE ORIGINAL VECTOR.
2. COMPUTE THE PEAK QUALITY.
3. TEST THE SIGNIFICANCE OF THE TARGET.
4. CHECK THE UNIQUENESS OF THE PEAK AND IF IT IS AN EXTREMELY OUTLYING VALUE.

FIG. 15

MODULATION PN CODE AT POINT-a

POLARIZATION SWITCHING CODE AT POINT-b

RECEIVER CABLE AND CLUTTER CODES PN GENERATOR, BLOCK-k

RX CLUTTER CODE FOR CORRELATOR AT POINT-g

RX CABLE CODE FOR CORRELATOR AT POINT-h

PN MODULATED CARRIER AT POINT-c

TRANSMITTED SIGNAL AT POINT-d

RECEIVED SIGNAL AT POINT-e

RECEIVED SIGNAL IN BASEBAND AT POINT-f

TERRAIN CORRELATION AT POINT-i

CABLE CORRELATION AT POINT-j

RADAR CABLE DETECTION SYSTEM

CLAIM OF PRIORITY

This application claims priority of U.S. Provisional Patent Application No. 60/932,091 filed May 29, 2007, entitled Radar Cable Detection System.

BACKGROUND OF THE INVENTION

1. Field of the Invention

The present invention relates to radar systems, and particularly to a system for detecting the presence of aerial power lines or cables in the flight path of an approaching aircraft.

2. Discussion of the Known Art

Elevated power lines pose a serious hazard to aviation. Such structures pose lethal hazards for low-flying aircraft, and have caused the loss of more than 50 lives and $600 million in property damage over a ten year period. Cable strikes have also become the leading cause of helicopter crashes. For example, in 2005, 18 percent of Army helicopter accidents were due to wire strikes.

Methods have been disclosed to reduce the risk of such collisions. One approach is the use of a passive system for sensing the presence of an extremely low frequency (e.g., 60 Hz in the U.S.) electromagnetic (EM) field that exists in the vicinity of live AC power transmission lines. Such systems are limited in range and by ambient weather conditions, and are inherently incapable of detecting power lines that are inactive or temporarily out of service. Power lines may also be configured to minimize the strength of their EM fields in view of health concerns for persons who live, work, or attend school nearby. In such cases, it is even more likely that passive systems will not be adequate to provide ample warning of the power lines to a pilot. See generally, "Assessment of Health Effects from Exposure to Power-Line Frequency Electric and Magnetic Fields", NIEHS Working Group Report, National Inst. of Health (NIH) Pub. No. 98-3981 (August 1998).

In combat situations, unenergized elevated cables may also be deployed as a countermeasure to obstruct helicopters from approaching a target. A passive cable detection system would therefore be unable to warn a pilot of the presence of such cables. Optical cable detection systems are also known, but their performance is affected by water and dust content in the air, and on surface conditions of target cables.

U.S. Pat. No. 7,136,011 (Nov. 14, 2006) discloses a ground-based field unit for warning of a danger of an impending collision between an aircraft and an elevated obstacle such as an aerial cable structure. The unit includes a mast, a radar antenna inside a casing with an electronics unit to form a radar system for detecting an aircraft in a coverage area, a central processing unit for identifying such aircraft and computing a collision danger area, and a high-intensity light and radio transmitter system that are activated when an aircraft is detected in the danger area. The transmitter provides a radio signal that carries an audible warning, and the system emits a high intensity warning light. The unit may also be arranged to link with and to activate neighboring field units to emit corresponding warnings, according to the patent.

Airborne systems that incorporate radar altimeters for forward obstacle detection, have also been disclosed. See U.S. Pat. No. 6,750,807 (Jun. 15, 2004) and U.S. Pat. No. 6,885,334 (Apr. 26, 2005). The '807 patent relates to a radar altimeter which, in addition to an altimeter antenna, has a forward facing millimeter wave (MMW) antenna arranged for scanning movement. A processor controls a scanning motion of transmissions from the MMW antenna, processes signals received at the altimeter antenna for a portion of the scanning motion, and processes signals received at the MMW antenna for other portions of the scanning motion. The '334 patent discloses the use of a radar altimeter with a forward looking antenna and an electronic terrain or digital elevation map (DEM) to provide precision terrain aided navigation.

Radar scattering cross sections of straight wires, obtained in response to plane electromagnetic waves at different angles of incidence, have been formulated. See, R. F. Harrington, et al, "Straight Wires with Arbitrary Excitation and Loading, IEEE Transactions on Antennas and Propagation", vol. AP-15, No. 4 (July 1967), at pages 502-15. The radar backscatter characteristics of high voltage power transmission lines, which are typically formed of a number of helically wound aluminum or copper outer strands and steel inner strands, have also been predicted. See, K. Sarabandi, et al, "A Radar Cross-Section Model for Power Lines at Millimeter-Wave Frequencies", IEEE Transactions on Antennas and Propagation, vol. 51, No. 9 (September 2003), at pages 2353-60. All relevant portions of the two mentioned articles are incorporated by reference.

A need remains, however, for an airborne radar system that can accurately and reliably detect elevated power lines and cables under a variety of environmental conditions and provide ample warning for the pilot to avoid a collision. Such a system is essential if the lives and safety of military and civilian personnel are to be protected when performing low level flight operations, especially under conditions of limited visibility due to time of day, weather, brownout or whiteout conditions, smoke or other battlefield obscurants.

SUMMARY OF INVENTION

According to the invention, a process for separating ground clutter from signals echoed by a cable in the flight path of an aircraft having a radar system, includes encoding a transmitted pulse wave in the radar system with at least one transmit (TX) coding sequence so that received signals echoed by a cable on which the pulse is incident, and associated ground clutter, are orthogonal or separable from one another. The TX coding sequence is altered into two receive (RX) coding sequences one of which corresponds to the cable and the other to the ground clutter. The two RX coding sequences are correlated with the received signals, thereby separating received signals echoed by the cable from those of the associated ground clutter.

For a better understanding of the invention, reference is made to the following description taken in conjunction with the accompanying drawing and the appended claims.

BRIEF DESCRIPTION OF THE DRAWING

In the drawing:

FIGS. 14 and 15 are algorithms that may be applied in the processing stage of FIG. 13 according to the invention;

DETAILED DESCRIPTION OF THE INVENTION

Because of their physical characteristics, power transmission lines and cables have a relatively small radar cross section (RCS). Backscatter, i.e., the amplitude and polarization of a signal reflected from a length of a given cable, is a function of the radio frequency of a radar pulse that illuminates the cable, as well as the angle of incidence of the pulse with respect to the cable. Accordingly, the inventive cable detection system is wideband and has sufficient processing gain to compensate for the frequency selectivity and small RCS of most cables. The system provides clutter suppression to aid in discriminating signals echoed from a cable in the path of flight, from signals that are scattered and reflected from surrounding terrain.

Figure 1:
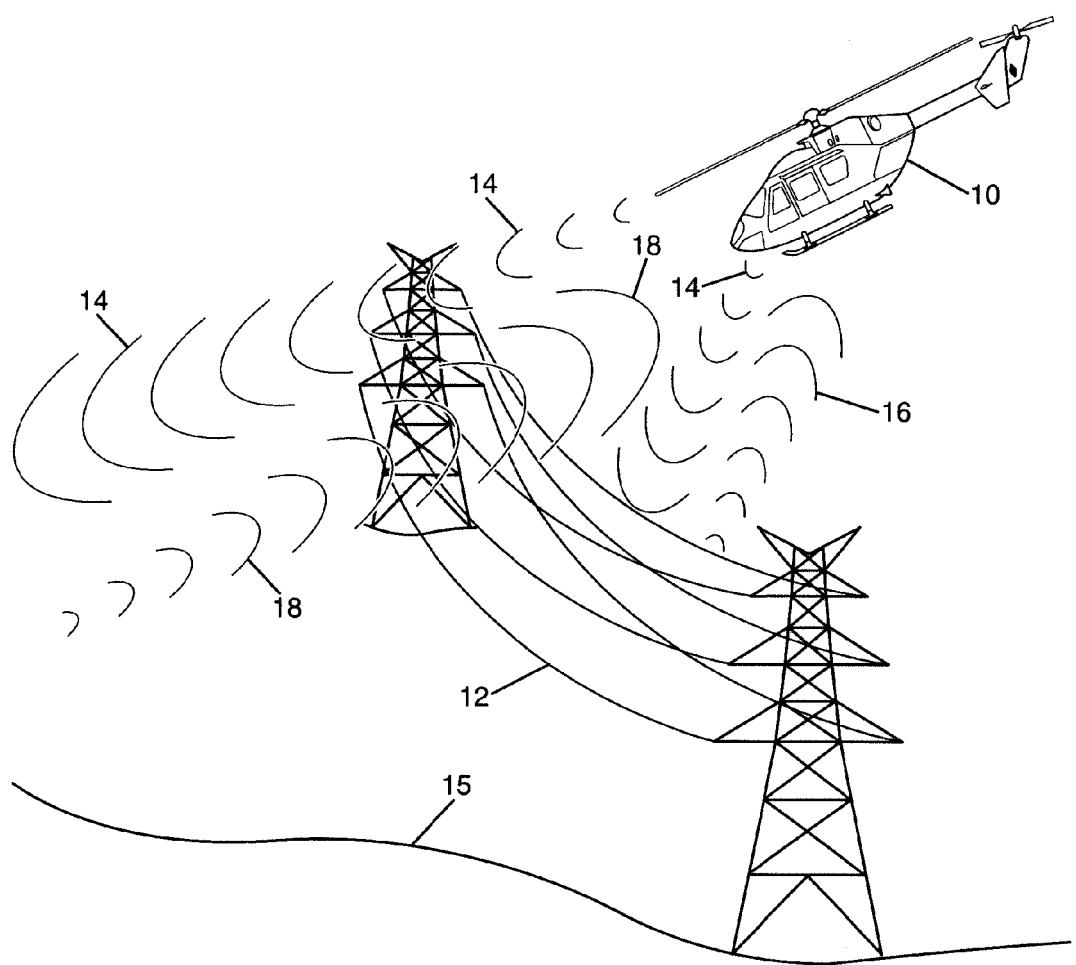
FIG. 1 illustrates a helicopter detecting the presence of elevated power lines in its flight path.

FIG. 1 shows a helicopter 10 in which the inventive system may be deployed. The helicopter 10 is detecting elevated power lines or cables 12 in the path of the helicopter's flight. Wave signals 14, corresponding to radar pulses transmitted by the system, are incident on a portion of the cables as well as upon an area of the surrounding terrain 15. The transmitted wave signals 14 are reflected back toward the helicopter 10 by the cables 12 in the form of cable echo signals 16. The same transmitted wave signals 14 are also reflected or backscattered toward the helicopter 10 by the ground in the form of ground clutter signals 18.

Figure 2:
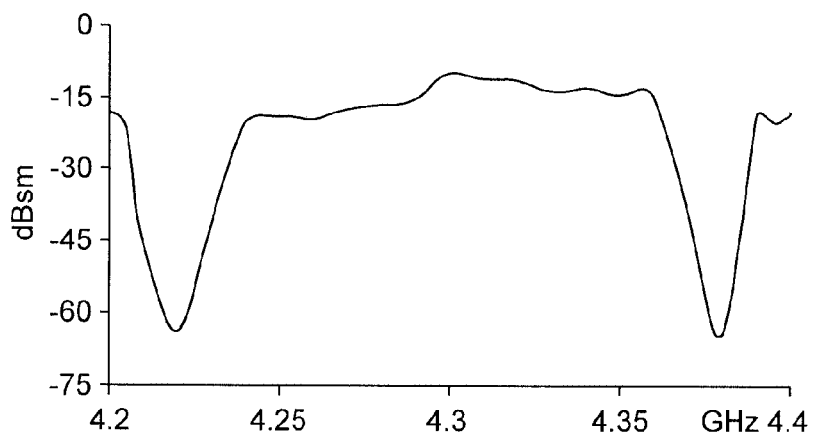
FIG. 2 shows the amplitude of a radar cross section of a long cable as a function of the frequency of the incident wave.

As mentioned above and shown, for example, in FIG. 2, when a wideband signal illuminates and interacts with a length of a long cable, the nature of the reflected signal depends significantly on the radio frequency (RF) of the illuminating wave. The inventive system therefore integrates received echo signals over an entire operating RF band, and, from the integrated signature, detects a target cable reliably even if the cable generates little if any echo in a portion of the transmitted RF spectrum. The transmitted waveform is preferably programmable for increased bandwidth when needed. Unlike passive detection systems that must sense an EM field next to live AC lines before issuing a warning, the inventive system is active in that it can sense the approaching power lines 12 whether or not the lines are energized.

Ground reflections have a large RCS that can mask the relatively small signals returned from cables. As explained below, by the use of a PN coded transmit waveform, the inventive system selectively suppresses unwanted signals returned from the ground or other interfering objects. A suppression capability of 20 dB has been achieved. In addition, the system makes use of differences in the wave polarizations of signals returned from power lines and signals returned from the ground, in order to discriminate a power line target from background clutter.

Because the system operates in a microwave RF range, it does not interact with water droplets in fog, rain or snow, or with dust. Propagation loss has been found to be moderate, e.g., less than 2 dB over an operational range. Also, the system does not have the shortcomings of optical systems which are vulnerable to fog, rain, dust, and surface conditions on target cables. Compared to known microwave cable detection systems, the inventive system is wideband, long-waveform, and dual-polarization, and uses active suppression and dual-polarization to separate cable from ground clutter echoes. The frequency and polarization diversity of the system offers distinct advantages over prior narrow-band, unipolar systems.

Detecting Weak Targets in Long Pulse Radars, and Decoupling of Clutter, Leakages and Weak Targets So-called long pulse radar allows for a small, low cost power amplifier which is very desirable. But the use of a long pulse may require a radar system to transmit and receive simultaneously, so that received signals will likely include leakage together with background clutter and actual target cable echoes. Overlapping of the transmitted and the received signals typically hampers the sensitivity, effectiveness and operational range of the receiver. Because the inventive system operates with a wide bandwidth, PN coded waveforms and other techniques explained below to discriminate real target returns from among background clutter and leakage, it is still capable of detecting weak targets including those having a negative SNR.

Resolving Target Phase Distance Under a Fixed Sampling Rate

Radar target resolution is nominally the inverse of bandwidth or sampling rate. The inventive system achieves a continuous target resolution up to the limit of system noise, without the limitation of a finite sampling rate. Accordingly, a pulse pair processing (PPP) technique is preferably used to obtain fine distance resolution. In the past, PPP techniques have only been used to obtain a Doppler shift or speed.

Reducing False Targets Due to Multi-Window Radar Second-Trip Echoes

For multiple-window radar, a so-called second-trip echo introduces a random false target that depends on the distance of the object producing the echo. Pulse radar systems suffer from a loss of coverage and sensitivity due to the second trip echo and "distance holes" phenomena. A time diversity waveform may be used to reduce the probability of detecting a random false target.

Figure 3A:
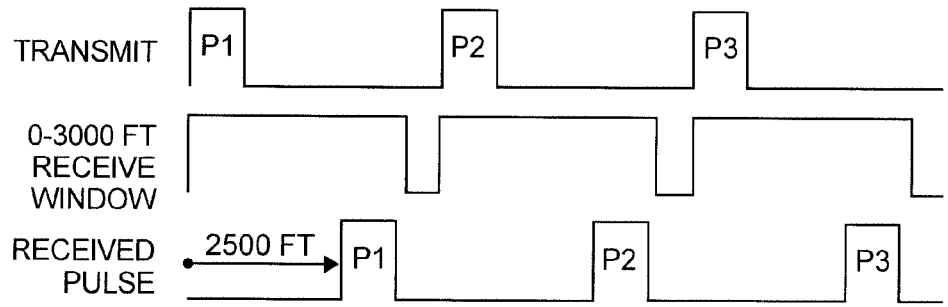
FIGS. 3(a) and 3(b) illustrate the concept of a false distant measurement in a multiple window radar system.
Figure 3B:
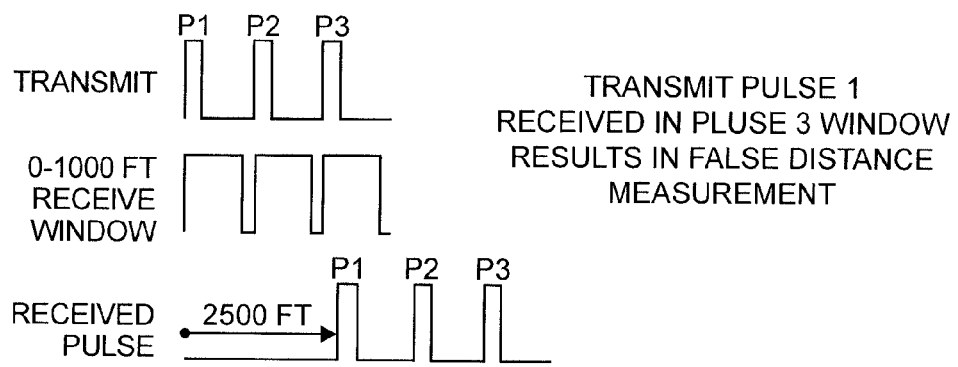

FIGS. 3(a) & 3(b) are examples of waveforms of pulses transmitted and received by a typical radar unit in an aircraft flying at 2500 feet. In FIG. 3(a), the rate at which pulses P1, P2, P3, . . . , are transmitted by the radar is set so that it operates with corresponding 0-3000 foot pulse receive windows, i.e., the radar is set to detect objects up to 3000 feet from the craft. Since the craft is at 2500 feet, an echo signal from the first pulse P1 will return about 2500 ns after it reflects from the ground or other object at 2500 feet distance, and the reflected pulse P1 falls unambiguously within the first 0-3000 foot pulse receive window.

In FIG. 3(b), the rate at which the pulses P1, P2, P3, . . . , are transmitted is increased so that the radar unit operates with shorter, 0-1000 foot pulse receive windows. Thus, if the transmitted pulse P1 is reflected by the ground or other target 2500 feet from the aircraft, the target will be detected during the third 0-1000 foot receive window (i.e., the window allowed for pulse P3), resulting in a false distance measurement for the target of only 500 feet. Conventional radars cannot determine if the echo received in the third receive window is a reflection of the first pulse P1 or a later pulse. If the pulses are individually PN coded, the rate at which false targets are detected may be reduced, but can not be entirely eliminated since such coding has a finite rejection capability. Note that the example of FIGS. 3(a) & (b) is for an aircraft flying relatively high and searching for lower/closer targets. The problem has a symmetric pair, viz., when the aircraft is flying relatively low and its radar unit is searching for higher/farther targets.

In the inventive system, the pulse receive windows are preferably randomized so that false echoes cannot accumulate at one point, or multiple points, to induce a false target signature and cause an erroneous output. This overcomes shortcomings in multi-window radars in a simple and effective manner.

Figure 4:
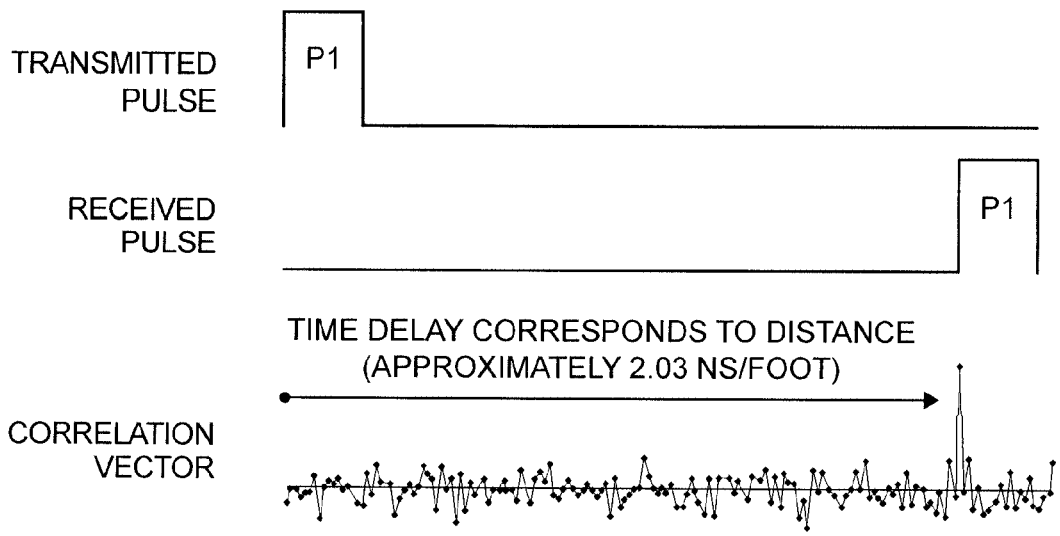
FIGS. 4 to 11 are graphs of waveforms illustrating the concepts of false distance measurements and distance holes, and a technique for eliminating the phenomena according to the invention.

Pulses transmitted and received by the system are PN-coded. A PN-correlation is performed on the received signals to determine a time delay between a given transmitted pulse and a corresponding received pulse, and to determine a corresponding distance to an object as shown in FIG. 4.

In real-world conditions, a correlation vector from a single radar pulse can be very noisy due to backscatter from the ground, antenna sidelobes, obstructions on the aircraft, and the like. It may therefore be difficult to distinguish a correlation peak representing a target from other peaks representing just noise. To increase the signal to noise ratio of the correlation peak relative to the noise, correlation vectors from a series of pulses may be combined and integrated. When the magnitudes of individual correlation vectors are integrated, correlation peaks representing stationary targets accumulate and increase in magnitude more rapidly than the noise floor.

Figure 5:
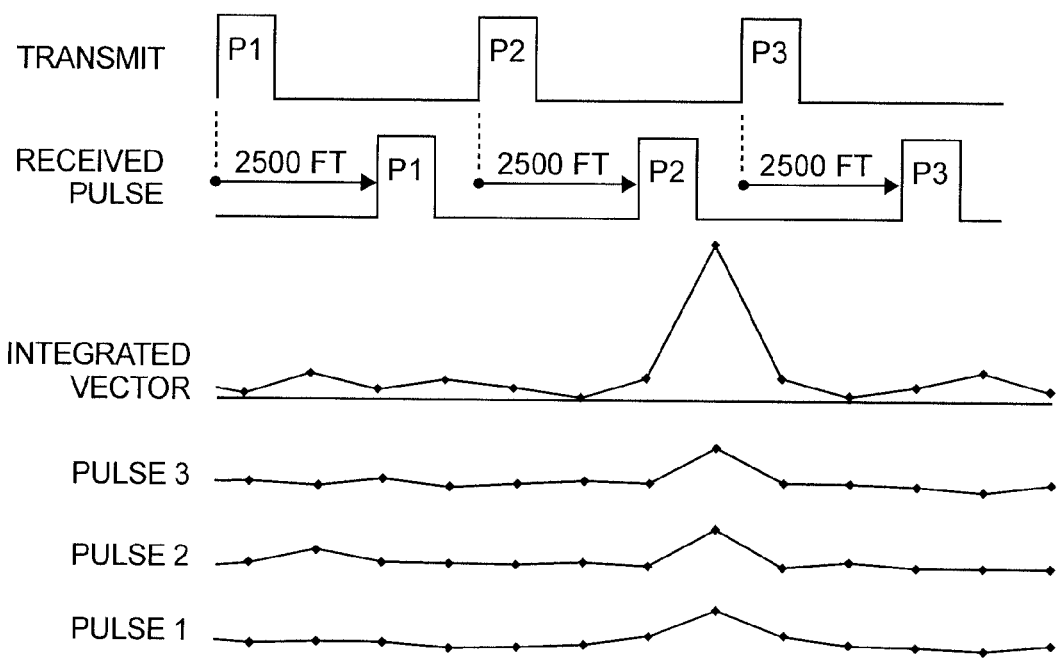

FIG. 5 shows an example of an integration of the three received pulses P1, P2, P3 in FIG. 3(a) to measure the distance of an object located 2,500 feet from the transmit antenna. For each pulse transmitted, a corresponding pulse is received approximately 5,075 ns or 2,500 feet later. The correlation peaks for the pulses line up and accumulate faster than the noise floor, resulting in an integrated correlation vector with a much higher signal-to-noise ratio than each of the individual pulses.

Figure 6:
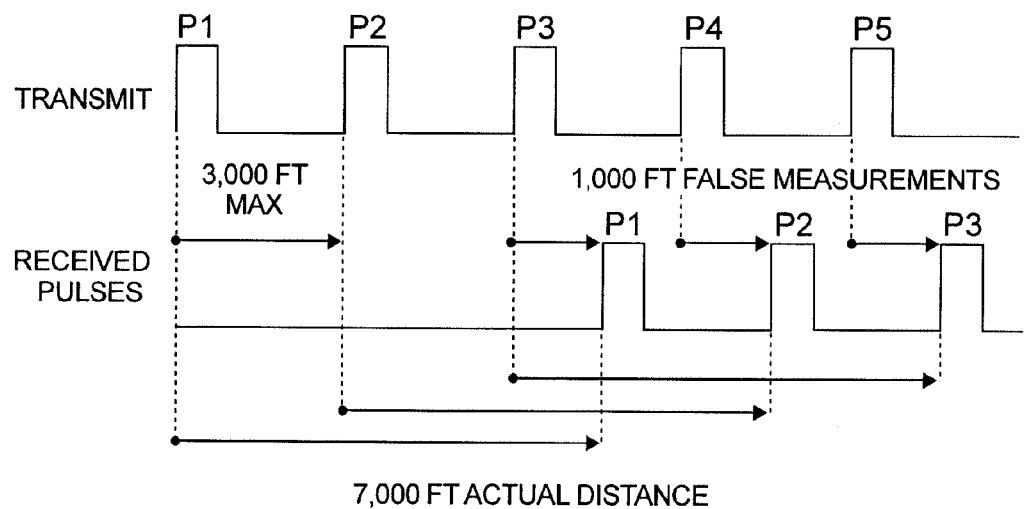

The time between successive pulses determines the maximum time delay or distance that can be measured for each pulse. As mentioned, a problem arises when the actual time delay or distance to a target object is greater than the time between successive pulses. In such case, the radar echo from one pulse can be received during a period in which an echo for an earlier pulse is expected, as shown in FIG. 6. This condition causes a false determination of the distance between the radar transmitter and the target object. Although the pulses are PN-coded, the coded pulse can reduce, but not eliminate the false correlation due to a finite rejection capability of the PN-code.

Figure 7:
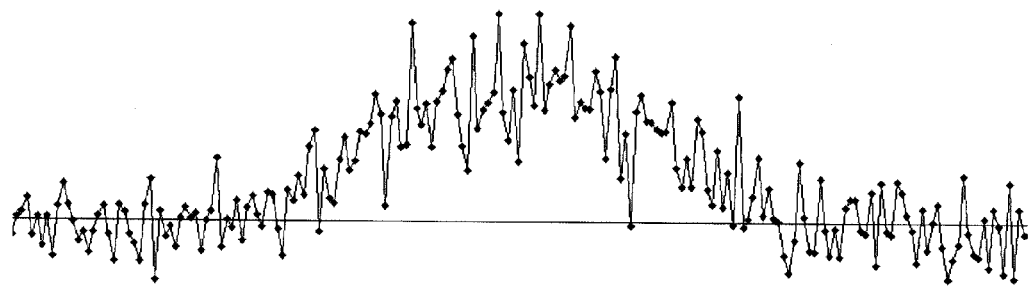

In the example of FIG. 6, the time between each of the transmit pulses P1 to P3 is 6,090 ns corresponding to about 3,000 feet. If an object is at 7,000 feet, its radar echos will be received about 14,210 ns after the transmission of each pulse. This overlaps with the windows during which echoes for pulses P3, P4 and P5 in FIG. 6 are expected to be received. The receiver will therefore incorrectly determine a target distance of 1,000 feet instead of 7,000 feet. A resulting integrated correlation vector for an accumulation of 100 pulses received for the incorrect distance is shown in FIG. 7.

Figure 8:
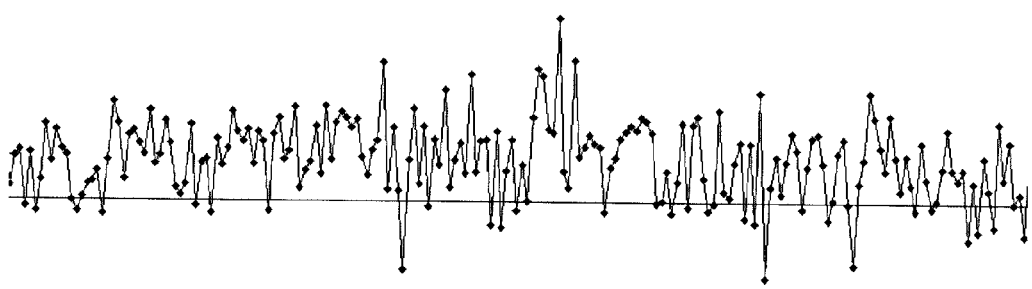

The probability of detecting a false target due to receiving a pulse at an incorrect time may be reduced, however, by introducing a random time jitter between the transmitted pulses. By randomly varying the time, and coding, between successive pulses, the probability of computing an incorrect correlation peak is greatly reduced by the amount of random jitter introduced, as well as by the random coding distance between pulses. The random jitter prevents energy from accumulating at a central point and from forming a fixed pattern, as shown in FIG. 8. The same conditions used to generate FIG. 7 were used in FIG. 8, except that the time between the pulses was randomly varied. The overall noise floor in FIG. 8 increased slightly, but there is no predominant correlation peak that could cause a false detection.

Figure 9:
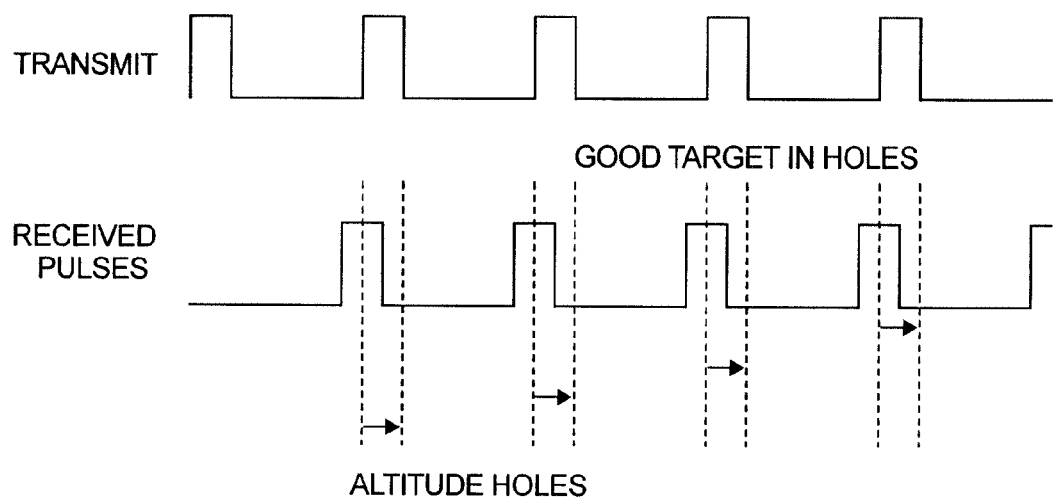
Figure 10:
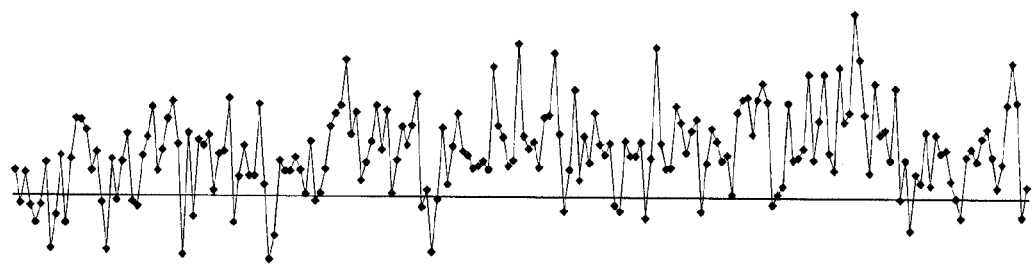

In addition, the inventive system eliminates so-called "distance holes" in pulse radar. For example, FIG. 9 is a timing diagram wherein the time between individual transmit pulses is 6,090 ns corresponding to a range of about 3,000 feet. If a target object is around 3,000 feet or a multiple (n) of 3000 feet distance, a radar echo will be received about n×6096 ns after transmission of pulses P1, P2 and P3. The timing of the echoes overlaps with the times during which pulses P(1+n), P(2+n) and P(3+n) are transmitted, however. The receiver will therefore receive only a partial or no echo, and determine incorrectly that no target object is present. A resulting integrated correlation vector for an accumulation of 100 pulses is shown in FIG. 10, wherein the target is hidden in the distance holes.

Figure 11:
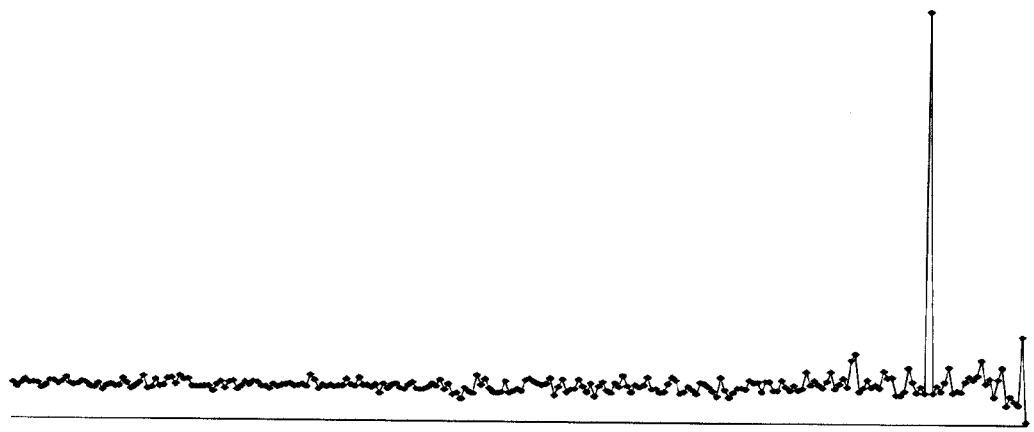

In the inventive system, distance holes due to receiving pulse echoes at an incorrect time are preferably reduced or eliminated by introducing a random time jitter between the pulses. That is, by randomly varying the time between successive pulses, the probability of hiding a correlation peak is diminished by the amount of random jitter introduced. The random jitter prevents distance holes from occurring consistently for the same distance. FIG. 11 shows an integration of echoes from 100 transmitted pulses, with a random jitter introduced in the timing between transmitted pulses. The same conditions used to generate FIG. 10 were used, except that the time between the pulses was randomly varied to eliminate the distance hole. As shown, a well defined integrated correlation vector is obtained.

Target Detection Through Anomalies of Non-Stationary Vector

In the inventive cable detection radar system, PN modulated microwave pulses from the transmitter are radiated and pulse echoes from target cables are input to the system receiver. The echo signals are match-filtered to enhance the targets and suppress noise. Signals produced after the matching filter and before a detection process in the receiver, are referred to herein as correlation vectors.

Figure 12A:
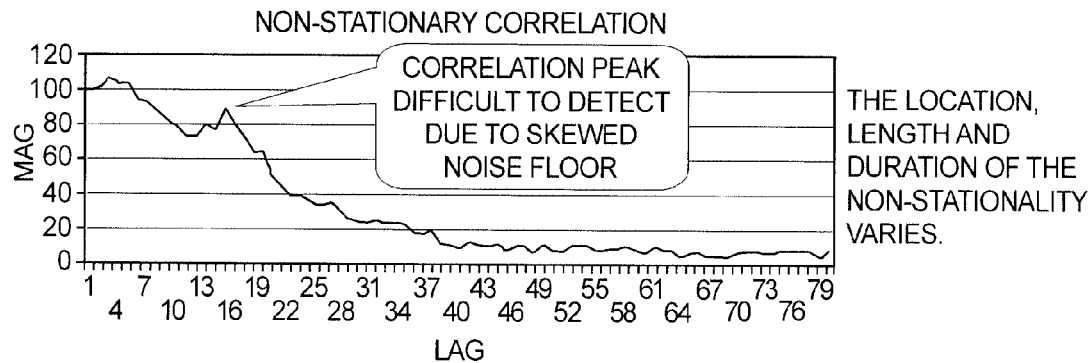
FIGS. 12(a) and 12(b) are waveforms showing correlation peaks with and without the presence of non-stationary vectors or structures.
Figure 12B:
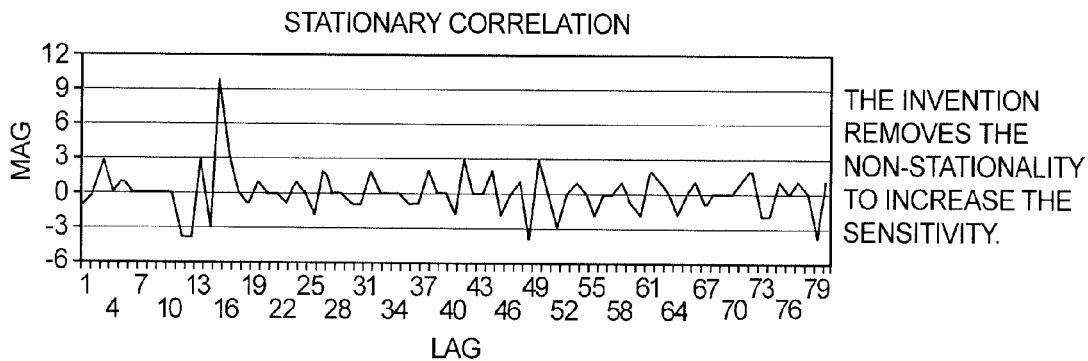

As illustrated in FIGS. 12(a) and 12(b), detection of targets is most effective when a so-called correlation vector is level or stationary, since the detection criterion is based on the prominence or significance of signals returned from the target as compared to the noise. The measure of significance is influenced by the variability of the noise and the correlation pattern itself. When the vector is not stationary, e.g., the vector exhibits a trend, the estimate of noise variance is inflated. Consequently, a target that shows up as a local peak will look obscure and fail the detection criterion. This limits the performance of a radar system.

In the inventive system, anomalies (referred to herein as "non-stationary structure") detected in received signals are preferably reduced or eliminated from correlation vectors to improve the SNR of target echoes, and to facilitate target detection and classification. A series of running medians are operated on an original correlation vector to smooth out random anomalies, leaving only the structure. In effect, targets are revealed in a detrended or residual vector as seen in FIG. 12(b). The estimate of noise variance is improved, and reliable and accurate detections are obtained. This technique is applicable to communication devices as well.

Rejection of correlation anomalies is a difficult problem in radar cable detection systems. Reflected waves received at the radar receiver typically include echoes from leakage, spikes due to switching the RF output of the transmitter power amplifier or PA (this echo is referred to as "non-stationary structure clutter"), besides signals echoed from distant cables. The non-stationary structure intrudes in real echo signals from the cables, making it difficult to obtain a cable signature from the received signals. Therefore, to eliminate non-stationary structure, a conventional radar cable detector must know where the anomalies occur in the correlation vector and adjust its detection criteria.

Considering the PA switching anomaly as an example, a known method of avoiding the anomaly is to use a relatively long switching guard time, and to begin sampling for pulse echoes after the guard time has elapsed. This creates a hole in the detection range, however. The actual switching time may change with frequency and temperature, so in this method a worst-case guard time must be assumed to avoid creating a false target in the correlation vector, leading to an undesirable hole in the detection range. Further, an effective elimination of all anomalies cannot be achieved. For example, ground echoes can create non-stationary structures in the correlation vector that vary considerably depending on changing wave propagation conditions and water content in the ground, woods, buildings, and other objects.

Figure 13:
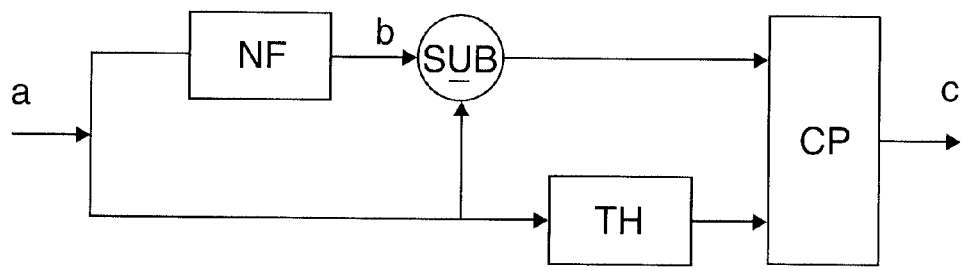
FIG. 13 is a block diagram of a processing stage for removing non-stationary structures according to the invention.

FIG. 13 is a block diagram of a processing stage including a running median non-linear filter NF, a subtractor SUB, a threshold calculator TH, and a comparator CP. FIG. 14 shows steps of transforming an original correlation vector using the stage of FIG. 13, wherein the running median non-linear filter NF takes the form of an algorithm. FIG. 15 shows the threshold calculator TH in the form of an algorithm to test the transformed vector for the presence of a target.

In FIG. 13, an output radar correlation vector (a) is fed into the running median filter NF and the threshold calculator TH. The filter NF captures structure due to intervention in the correlation vector, and the structure (b) is subtracted from the correlation vector (a). The remainder is compared via the comparator CP with the threshold calculated by the calculator TH. An output (c) from the comparator CP represents received radar echoes without degradation due to intervention.

Let $P_t$ be a sequence of PN code of finite length K with $Var(P_t)=1$. Considering an echo signal from a certain bin at a certain range, the intensity of the received wave in the radar receiver is $X_t$. There exists an intervention due to some known/unknown but uncontrollable factors that starts at time l and lasts for m periods. The returned vector $X_t$ takes the form $$X_t = BP_{t-d} + \sum_{i=0}^{m-1} A_i P_{t-1-i} + \varepsilon_t \qquad (1)$$

where
B is the propagation and target size effects,
d is the round trip time,
$A_i$ is the effect of intervention at time i after the starting point l, i=0, 1, ..., m−1, and $\varepsilon_t$ is the random noise at time t.

Assumptions: 1. $\{\varepsilon_t\}$ is uncorrelated.
2. $\varepsilon_t$ and $P_t$ are uncorrelated.

For $k \leq K$, the covariance between $X_t$ and $P_{t-k}$ is $$Cov(X_t, P_{t-k}) = Cov\left(BP_{t-d} + \sum_{i=0}^{m-1} A_i P_{t-1-i} + \varepsilon_t, P_{t-k}\right) = \qquad (2)$$

$$\begin{cases} B + A_j, & \text{if } k = d = l+j;\ j = 0, 1, \ldots, m-1 \\ A_j, & \text{if } k \neq d,\ k = l+j;\ j = 0, 1, \ldots, m-1 \\ B, & \text{otherwise} \end{cases}$$

$$Var(X_t) = \begin{cases} (B+A_j)^2 + \sum_{i=0, i \neq j}^{m-1} A_i^2, & \text{if } d = l+j;\ j = 0, 1, \ldots, m-1 \\ B^2 + \sum_{i=0}^{m-1} A_i^2, & \text{otherwise} \end{cases} \qquad (3)$$

Thus the lag k cross-correlation between $X_t$ and $P_t$ is $$\rho_{XP}(k) = Corr(X_t, P_{t-k}) = \qquad (4)$$

$$\begin{cases} \dfrac{B+A_j}{\sqrt{(B+A_j)^2 + \sum_{i=0, i \neq j}^{m-1} A_i^2}}, & \text{if } k = d = l+j;\ j = 0, 1, \ldots, m-1 \\[2ex] \dfrac{A_j}{\sqrt{B^2 + \sum_{i=0}^{m-1} A_i^2}}, & \text{if } k \neq d,\ k = l+j;\ j = 0, 1, \ldots, m-1 \\[2ex] \dfrac{B}{\sqrt{B^2 + \sum_{i=0}^{m-1} A_i^2}}, & \text{otherwise} \end{cases}$$

For $k > K$, $\rho_{XP}(k) = 0$.

From Equations (1) to (4), it is seen that in the ideal situation, $A_i=0$ for all i, the cross-correlation vector contains a single spike to indicate the presence of a target.

In practical situations, however, due to the imperfection of RF, coding, and/or other random anomalies, the cross-correlation vector contains structures that often conceal the target. These structures stem from the intervention, $A_i \neq 0$ for some i, that takes place at a random time causing a dominating hump in the cross-correlation vector. This intervention interference reduces the SNR and makes it difficult to detect the real target in the correlation vector.

For example, the intervention due to transmitter RF switching can be more than 30 dB stronger than the received echo of the transmitted signal, because of the close proximity of the transmitter or power amplifier (PA) to the receiver. The intensity of the PA intervention decays in time and varies in location, reflecting the random nature of the RF switching curve and the frequency span. Consequently, the $\rho_{XP}(k)$, with a finite length of correlation, has a large residual and this residual decays stochastically as the correlation lag increases.

The detection of desired targets is most effective when the correlation vector is stationary, as the radar detection criterion is based upon the significance of the target as compared to the noise floor. The variability of the noise and the correlation pattern itself influence the measure of significance. When the vector is not stationary, e.g., the vector contains humps or ramps, the estimate of noise variance increases, and so the signal to noise ratio decreases. Consequently the target that rides on a local hump or ramp will look obscure and fail the detection criteria.

In the inventive cable detection system, non-stationary structures in the vector are removed so that the target is revealed and can be identified. The correlation vector after the non-stationary structures are removed, is referred to herein as the transformed or stationary vector, even though the vector may not be strictly stationary. The inventive process has two steps:

Step-1

First, a running median smoother with end-point adjustment is operated on the original correlation vector to capture the non-stationary structure in the original vector. Suppose the original correlation vector is of length n. The smoother equations with span M are $$Sm_k = \text{median}(\rho_{XP}(k-M+1), \rho_{XP}(k-M+2), \ldots, \rho_{XP}(k), \ldots, \rho_{XP}(k+M-2), \rho_{XP}(k+M-1)),$$

k=M,M+1, . . . , n−M+1 where $$\rho_{XP}(k) = \text{Corr}(X_t, P_{t-k})$$

For k=2, 3, . . . , M−1 and k=n−M+2, n−M+3, . . . , n−1, the width of the span is reduced and fewer terms are used in the computation of median $Sm_k$ near two ends. For example, $$Sm_2 = \text{median}(\rho_{XP}(1), \rho_{XP}(2), \rho_{XP}(3))$$

$$Sm_{n-1} = \text{median}(\rho_{XP}(n), \rho_{XP}(n-1), \rho_{XP}(n-2)) \qquad (5)$$

For k=1 and k=n, the smoothed end points are $$Sm_1 = \text{median}(\rho_{XP}(1), \rho_{XP}(2), \rho_{XP}(1) + \rho_{XP}(2) - \rho_{XP}(3))$$

$$Sm_n = \text{median}(\rho_{XP}(n), \rho_{XP}(n-1), \rho_{XP}(n) + \rho_{XP}(n-1) - \rho_{XP}(n-2))$$

This span-M running median is a non-linear filter, a robust statistical procedure that locally smoothes the vector. It uses a moving time window of 2M+1 terms, constructed around each data element in the vector in turn, and fits the median of the data in the window. The value of median of the correlation data included in the window will replace the data point at the center of window. At least five terms are used in the smoothing process so that it is resistant to outliers while the main structure is still retained.

Step-2

Once the structure is obtained, the stationary correlation vector, or residuals of non-stationary correlation, can be computed. This stationary vector contains stationary noises with the clear target shown up as an outlier. The estimate of noise variance from the stationary vector is more reliable and accurate. Since the noise in the stationary vector has a much smaller variance than in the original non-stationary vector, the target spike becomes more pronounced, i.e., SNR increases.

$$D_k = \rho_{XP}(k) - Sm_k \qquad (6)$$

Step-3

The running median smoother is very effective in amplifying the local outliers as well as other stationary residuals. As a result, some large noises may be mistakenly conceived as targets. Therefore, additional steps are taken as a precaution to ensure they are genuine targets. According to the invention, the following three tests are used to inspect the quality of the tentative peak, and to rule out all kinds of noise, as follows:

The target peak could show up in the stationary vector, EQ-6, as a single large spike or the top of a small local hill. A single spike could also be just pure noise. Thus, first check the curvature of the stationary vector, EQ-6, in the neighborhood of its local maximum to determine if the local maximum in the stationary vector is merely a hump in the original vector.

The total number of chips around the local maximum to be inspected is 5 or 9 depending on the length of vector, i.e., 5 for short vector and 9 for long vector. Count the number of chips near the local maximum that are larger than the cutoff which is defined as $$\text{cutoff} = Q_3 + 0.5 * \text{IQR} \qquad (7)$$

where $Q_3$ is the third quartile and IQR is the inter-quartile range of the original vector. This is roughly equal to median+IQR in the symmetric case. The value of the number of chips above cutoff determines the value of critical percentage (F) of smoothed component for which any EQ-6 component whose magnitude is smaller than that is considered noise. In order to qualify as a peak in the EQ-6 vector, the local maximum by itself must be sufficiently large compared to the smoothed value, i.e., the size is at least 60-75% of the smoothed vector. This 60-75%, which is the F value, is lowered down to 20% or less whenever there is a hump in the original vector.

After the possible target passes the noise test, it goes through a statistical significance test. The target is considered statistically significant if its peak quality is very large. The peak quality is defined as $$PQ = \frac{\text{Peak value} - \text{Median}}{SD} \qquad (8)$$

where the SD or standard deviation is estimated from the IQR of the EQ-6 vector, so it is resistant to outliers in that vector.

In addition to being highly significant, the possible target must be the only peak and fall outside the outlier cutoff. That is, if $$\text{Peak value} > Q_3 + c * \text{IQR}, \qquad (9)$$

then the target is declared as the real target peak. Here, $Q_3$ and IQR are the third quartile and the inter-quartile range of the EQ-6 vector, respectively, and c is the critical value which is chosen according to the level of the curvature of the original vector near the target. Usually c is between 3 to 5.

From the foregoing, the SNR of a real cable echo can be improved if the above process is used to suppress intervention clutter. When the intervention clutter is greater than the cable echo, the process rejects the intervention clutter and elevates the cable signal. When no intervention clutter exists, the process does not harm the cable signal. The obtained intensity is highly reliable even if the intervention clutter exists together with the cable echoes. Thus, a target cable is detected with a higher reliability.

FIGS. 16(a-c), 17(a-c), and 18(a-c) are examples of signal waveforms at various points in FIG. 13, with respect to correlation vectors obtained at the receiver and input at point (a) in the processing stage of FIG. 13.

Figure 16A:
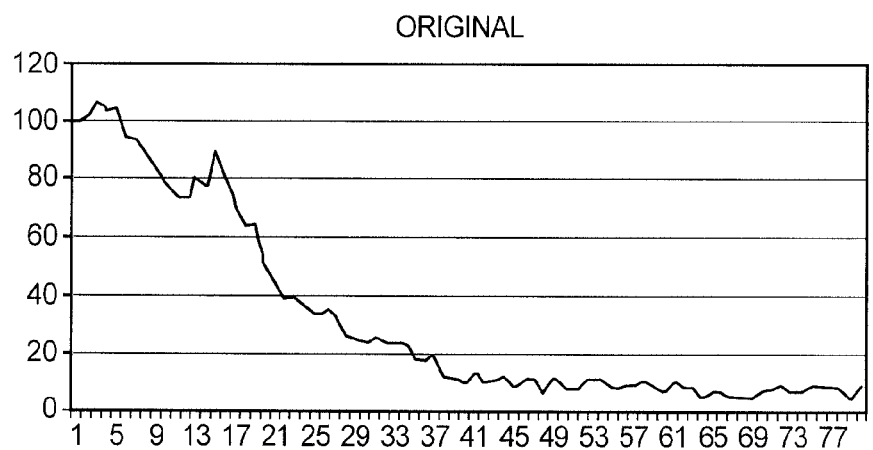
FIGS. 16(a)-(c), 17(a)-(c) and 18(a)-(c) show corresponding correlation signals from which non-stationary structures are derived and then removed in transformed correlation signals.
Figure 17A:
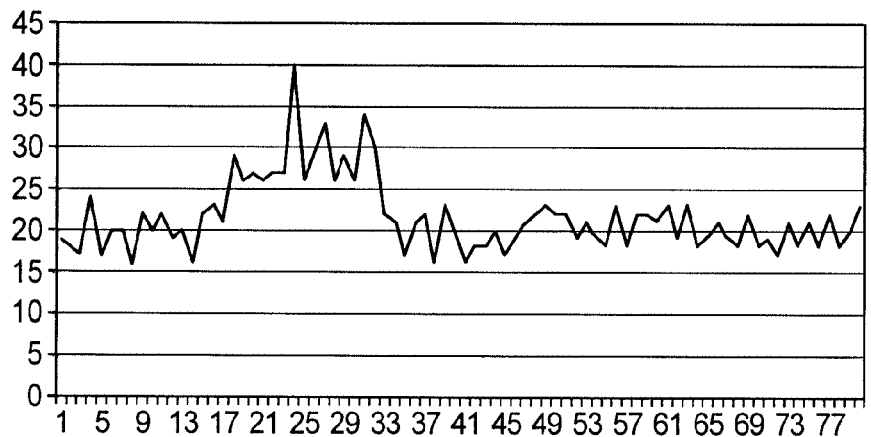
Figure 18A:
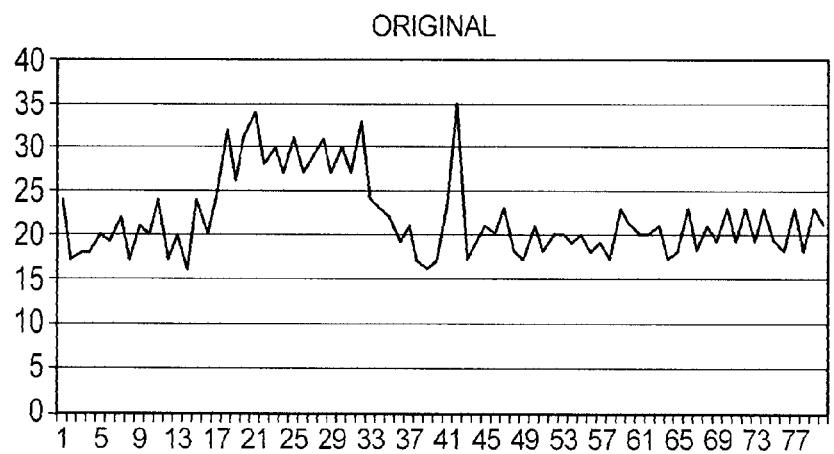

The waveforms in FIGS. 16(a), 17(a) and 18(a) show a received pulse after its RF carrier has been removed and its base band signal has been match-filtered by a correlator. An intervention, appearing as a dominating hump in each figure, obscures the presence of a target cable.

Figure 16B:
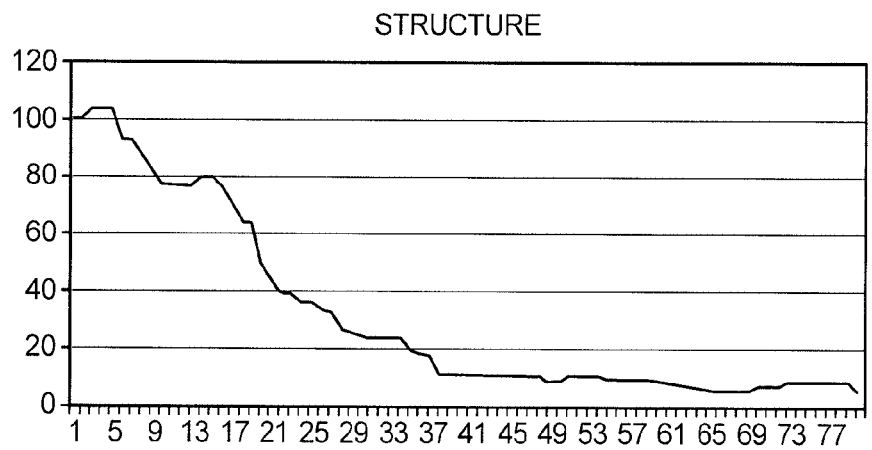
Figure 17B:
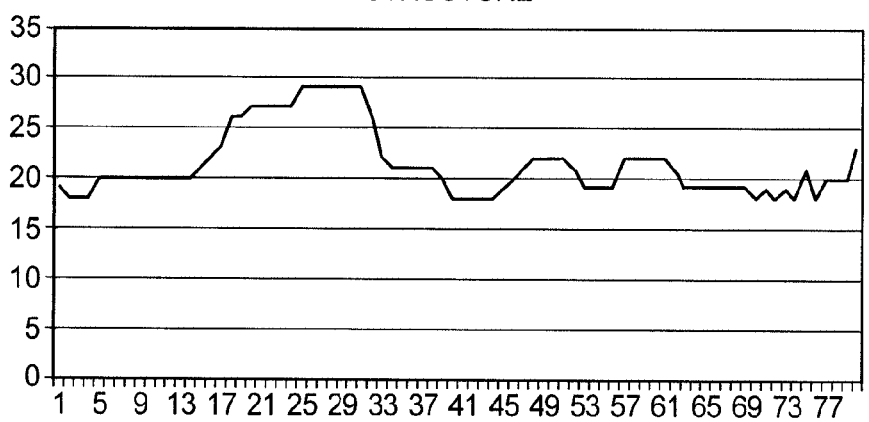
Figure 18B:
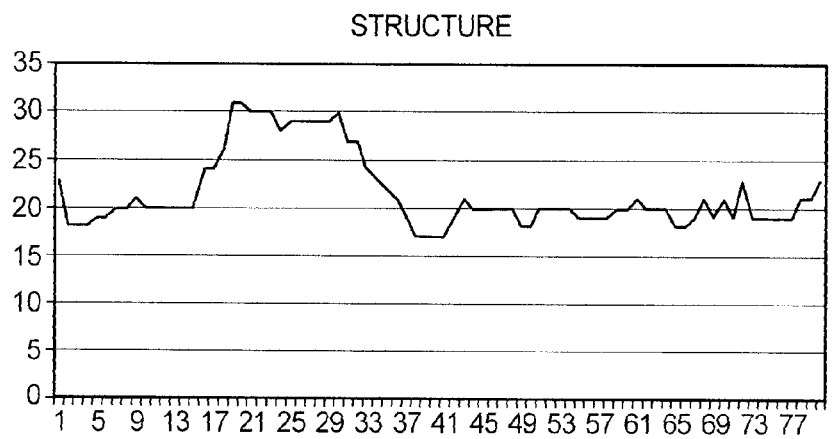

FIGS. 16(b), 17(b) and 18(b) show waveforms of structures due to intervention. Non-stationary structures are extracted by the non-linear filter NF.

Figure 16C:
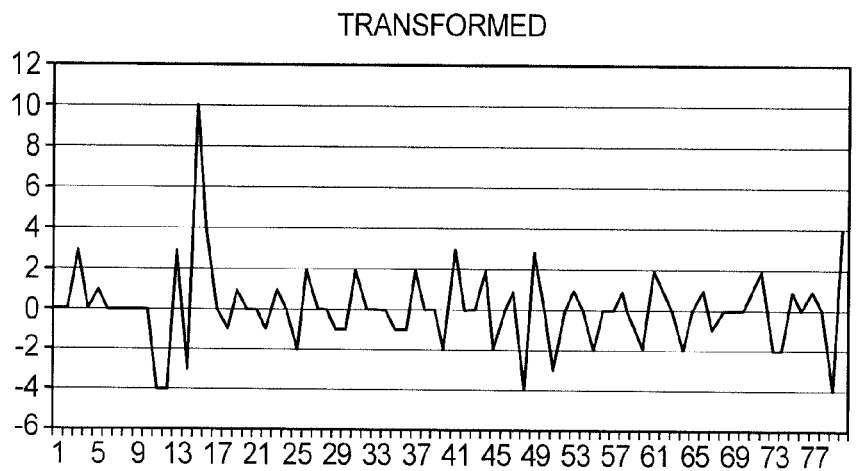
Figure 17C:
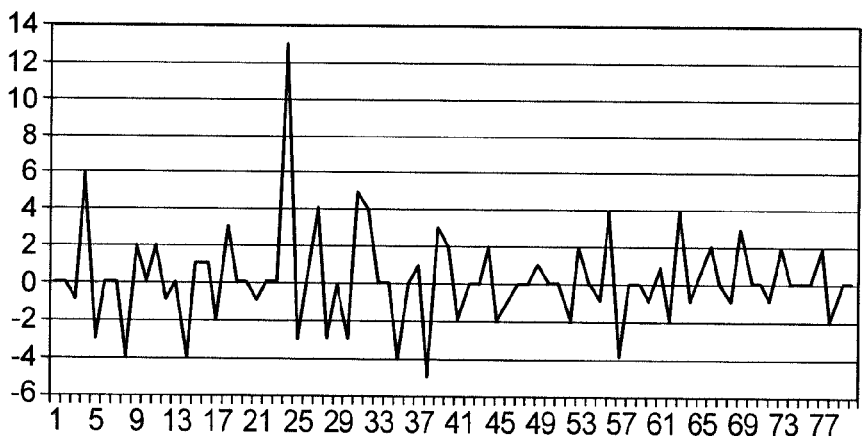
Figure 18C:
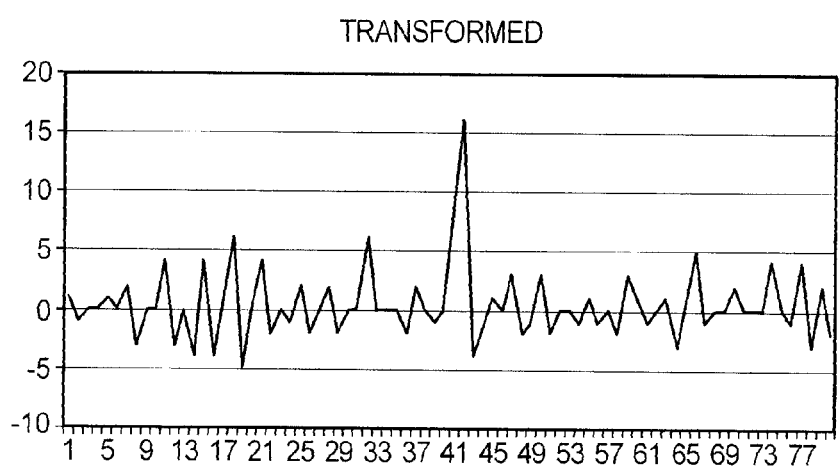

FIGS. 16(c), 17(c) and 18(c) show examples of resulting waveforms after the non-stationary structures due to intervention are removed from the original correlator outputs. Remaining stationary noise appears in the figures as a level noise floor, and well defined target peaks stand above the noise floors.

Referring back to the algorithm of FIG. 15, it is readily noted that the power of the intervention hump is larger than the power of the echoed cable signal when the intervention is due to PA switching or common terrain structures. Removal of this intervention power therefore significantly improves the SNR of a target cable, or other targets having a relatively low RCS.

Thus, even if interventions due to system anomalies or a large terrain are present among echoed signals representing a target cable, signals whose amplitudes correspond only to the intensity of the echoed cable signals are obtained by extracting structure due to the interventions, and removing the structure before detection processing in the receiver. This makes it possible to measure the amplitude of the echoed cable signals independently of any ground clutter among which the cable echoes exist, and more reliable cable detection is obtained.

Suppressing Terrain Backscatter by Polarization Sequences

As discussed earlier, terrain backscatter is a prevailing detriment in the operation of radar cable detection systems whenever transmitted pulse waves 14 intercept the ground 15, as seen in FIG. 1. The inventive system overcomes this problem by coding the transmitted waves in both the frequency and polarization domains, and de-spreading the returned waves in the two domains so as to separate target cable echoes from ground clutter, and to identify real cable targets.

Because the main beam or the side lobes of the transmitting antenna also touch the terrain, clutter signals (hereafter "ground clutter") are reflected from the terrain and are among the received signals. In typical cable detection systems, microwave pulses are radiated at a certain repetition frequency from the transmitting antenna, and echo signals from approaching cables are received at the receiving antenna. The intensity of the received signals depends on the frequency and the polarization of the radiated pulses, and their angle of incidence relative to a given target cable. The signals are envelope-detected at the receiver to produce a signal that corresponds to each radiated pulse.

In the inventive system, cables are detected by combining received signals that correspond to pulses transmitted over a wide spread of microwave frequencies, while the polarization of the transmitted pulse waves is parallel to the cable and the antenna beam is steered to within, e.g., +/−30 degrees of the broad side direction of the cable. The echoed signals are match-filtered to suppress noise and enhance target signatures. The result is applied to an indicator for displaying the direction and the distance of a target cable and the relative approaching speed.

Known indicators such as a plan position indicator (PPI), return height indicator (RHI) and others may be used. For example, a cable detected at a certain distance from the radar system may be identified by the brightness of a line pattern on a PPI scope. Moreover, the echoed signals may be input to a computer or data processing device to obtain additional information such as, e.g., the approaching speed, time to impact, and certain physical characteristics of the cable.

As mentioned, reflected waves received at the radar receiver include ground clutter as well as cable echoes. The ground clutter tends to interfere with the cable echoes, making it difficult to obtain a defined cable signature from the returned signals. To reduce ground clutter, conventional radar detectors must know where the radiated beam intercepts the ground, and then steer the beam upward to avoid having ground clutter overwhelm the echoes from a desired target.

A known method of avoiding ground clutter includes accessing a terrain data base that stores ground height, and steering the main beam of the transmit antenna to skim the ground. The method requires a large capacity memory to store the ground height and associated parameters corresponding to an entire flight operations area. The parameters are also subject to change with the seasons. Since the stored data is used to compute a scattered power which is then subtracted from the echoed signals, expensive computer equipment is required and real time processing is not practical. Further, an effective elimination of ground clutter cannot be achieved because the intensity of the ground echoes can vary considerably over only several hours depending on changes in wave propagation, and water content in the ground, woods, and buildings.

It has been discovered that for a suitable transmitted pulse wave polarity, the power of the signal echoed by a target cable will differ from the power of a signal echoed from the ground at the radar receiver, and that by incorporating the orientation of the wave polarization into the pulse coding, echoed signals from a target cable and those due to ground clutter can be separated from one another. Accordingly, in the inventive cable detection system, received signals are correlated with determined cable and terrain altered modulation codes. The correlation with the terrain is first subtracted from the received echoes, and the remaining information is then correlated with the cable altered sequence to maximize the cable signal for detection.

In the inventive cable detection system, microwave pulses are radiated from the transmitting antenna at predetermined intervals, and echo signals corresponding to the pulses are reflected from a cable and are detected at the radar receiver. Echo signals for a number of pulses at different frequencies are integrated at the receiver to obtain an indication of the presence of the cable.

Consider a cable echo signal from a certain bin at a certain range. A "bin" is the equivalent of the range of distance covered in one chip used in the correlation for the radar. The bin distance resolution will vary depending on the sampling rate.

The intensity of the wave received at the radar receiver is proportional to the RCS of the cable. When the cable is electrically large, the RCS ($\sigma$) is:

$$\sigma = \frac{2\pi r L^2}{\lambda}\cos^2\theta \frac{\sin(2\pi L\sin\theta/\lambda)^2}{2\pi L\sin\theta/\lambda} \quad (1)$$

where r is the radius of cable, and

L is the length of cable illuminated by the transmitted wave.

When the cable is electrically small, the RCS is:

$$\sigma_{hh} = \frac{\lambda^2}{\pi K K^*} E_1 E_1^* \quad (2)$$

$$\sigma_{vv} = 0$$

where $$E_1 = \frac{\sin(2ql)}{\cos\theta} - (T_1+T_2)\frac{\sin(\beta+q)l}{1+\cos\theta} - (T_1-T_2)\frac{\sin(\beta-q)l}{1-\cos\theta}$$

$$K = 2\log\frac{2l}{a} + 2\log 2 + \frac{a}{l} - C_{in}2(\beta+q)l - C_{in}2(\beta-q)l - \frac{\sin 2(\beta+q)l}{2(\beta+q)l} - \frac{\sin 2(\beta-q)l}{2(\beta-q)l} - i\left[S_{in}2((\beta+q)l+\right.$$
$$\left. S_{in}2(\beta+q)l + \frac{\cos 2(\beta+q)l-1}{2(\beta+q)l} - \frac{\cos 2(\beta+q)l-1}{2(\beta-q)l}\right]$$

$$T_1 = \frac{2K\cos ql - (De^{iql}+Ge^{-iql})}{2L\sin\beta l - (Ee^{i\beta l}+Fe^{-i\beta l})}$$

$$T_2 = \frac{2K\sin ql - (De^{iql}+Ge^{-iql})}{2L\sin\beta l - (Ee^{i\beta l}+Fe^{-i\beta l})}$$

$$L = 2\log\frac{2l}{a} + 2\log 2 + \frac{a}{l} - C_{in}4\beta l - \frac{\sin 4\beta l}{4\beta l} - 1 - i\left(S_{in}4\beta l + \frac{\cos 4\beta l - 1}{4\beta l}\right)$$

$$D = C_{in}2\beta l - C_{in}2(\beta+q)l + iS_{in}2(\beta+q)l$$

$$G = C_{in}2\beta l - C_{in}2(\beta-q)l + iS_{in}2(\beta-q)l$$

$$E = C_{in}2\beta l - C_{in}4\beta l - iS_{in}4\beta l$$

$$F = C_{in}2\beta l$$

$$q = 2\pi/\lambda\cos\theta$$

The nature of the cable return signal thus varies from being independent of the polarization of the incident wave to being highly dependent, depending on the size of the cable diameter relative to the wave length of the incident wave.

The ground echo signal at the same range bin in the receiver is proportional to the following RCS equation (3) for terrain, $$\sigma_{hh} = 4\pi k^4 \cos^4\theta_i W(-2k\sin\theta_i, 0) \quad (3)$$

$$\sigma_{vv} = 4\pi k^4 (1+\sin^2\theta_i)^2 W(-2k\sin\theta_i, 0)$$

where $$W(p,q) = \frac{1}{\pi^2}\int dx_d \int dy_d <\zeta(x_1,y_1)\zeta(x_2,y_2)>$$
$$e^{(-ipx_d-iqy_d)}$$

At shallow angles, the return signal from the terrain is 20 dB smaller when the polarization of the incident wave is horizontal to the terrain, than when the wave polarization is vertical.

Equations (1) to (3) show that the power of the echo from the cable differs from the power of the echo from the terrain when the polarization of the wave changes. Specifically, the power of a cable echo either stays constant or decreases when the transmitted pulse wave polarization changes from horizontal to vertical. By contrast, the power of a return signal from the terrain increases when the polarization of the transmitted pulse wave changes from horizontal to vertical. Accordingly, if the polarization of the wave of a transmitted pulse is coded to spread over the duration of the pulse, echo signals returned by a target cable will have a different polarization spread than that of signals returned by the terrain. The inventive system makes use of this difference to reject ground clutter. The following is an analysis of a case where ground clutter returns are received together with cable echo signals.

The amplitude of total echo power received at the radar antenna is given by the following Eq. (4):

$$P_{rx} = \frac{P_{tx}\lambda^2(\sigma_{cable}PN_{cable}+\sigma_{terrain}PN_{terrain})}{(4\pi)^3 R^4} \quad (4)$$

where $\sigma = T$ arg $et$ RCS $\rho(PN_{cable}, PN_{terrain}) = 0$

A correlation, or matching filter, of the original code sequence PN and the total received signal of Eq. (4) is dominated by the terrain echo:

$$\rho(PN, PN_{rx}) = \rho(PN, \sigma_{cable}PN_{cable}) + \rho(PN, \sigma_{terrain}PN_{terrain}) \quad (5)$$
$$= \frac{\sigma_{cable}}{2} + \frac{\sigma_{terrain}}{2}$$

A correlation or matching filter with the altered PN sequence to the total received signal of Eq. (4) therefore eliminates the terrain:

$$\rho(PN_{cable}, PN_{rx}) = \rho(PN_{cable}, \sigma_{cable}, PN_{cable}) + \quad (6)$$
$$\rho(PN_{cable}, \sigma_{terrain}PN_{terrain})$$
$$= \sigma_{cable}$$

In Eq. (6), the correlation between PN cable and PN terrain is zero. In practical implementations with a finite code length, the suppression is 10 log(PN length), e.g., 30 dB for 1,000 chips. Comparing Eq. (5) to Eq. (6), the net advantage is therefore 30 dB, assuming a 1000-chip code length.

Another way to reject the terrain clutter is to identify the terrain strength by correlating the total signal with the terrain-altered code sequence:

$$\rho(PN_{terrain}, PN_{rx}) = \rho(PN_{terrain}, \sigma_{cable}, PN_{cable}) + \quad (7)$$
$$\rho(PN_{terrain}, \sigma_{terrain}PN_{terrain})$$
$$= \sigma_{terrain}$$

Then subtract the terrain from the total signal and correlate the residual with the original sequence or cable sequence in the thick cable case:

$$\rho(PN_{cable}, PN_{rx} - \sigma_{terrain}PN_{terrain}) = \rho(PN_{cable}, \sigma_{cable}, PN_{cable}) + \quad (8)$$
$$\rho(PN_{cable}, \sigma_{terrain}PN_{terrain}) -$$
$$\rho(PN_{cable}, \sigma_{terrain}PN_{terrain})$$
$$= \sigma_{cable}$$

The implementation in Eq. (8) is suitable for an electrically large cable as well.

Therefore, when the ground clutter is greater than the cable echo, the correlation-match-filter with altered sequence will reject the terrain echo and elevate the cable signal by a margin corresponding to the run length of the code. When no ground clutter exists, the altered correlation does not harm the cable signal. A PN coding sequence with polarization altered by the cable and altered by the terrain, is given below.

Figure 19:
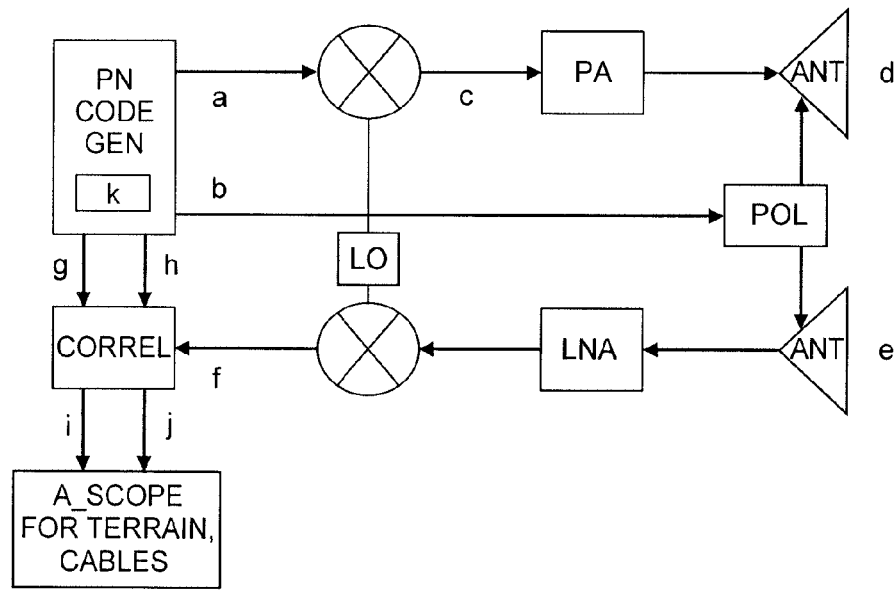
FIG. 19 is a block diagram of an embodiment of the inventive radar cable detection system.

FIG. 19 is a block diagram of one embodiment of the inventive cable detection system. In FIG. 19, the system includes a pulse transmitter and power amplifier PA, a receiver having a low noise amplifier LNA, a PN code generator, aa antenna polarization switch POL, a transmit antenna coupled to an output of the PA and a recive antenna coupled to an input of the LNA. The system also includes a local oscillator LO outputs of which are coupled to mixers associated with the PA and with the LNA, a correlator, and an A-scope coupled to an output of the correlator to indicate the presence of cables and the surrounding terrain.

Figure 20:
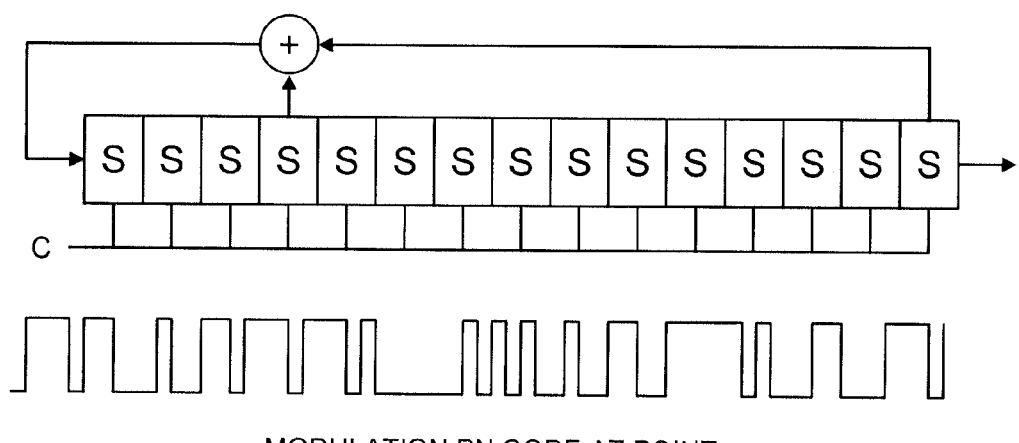
FIG. 20 shows one stage of a PN code generator in the system of FIG. 19.

FIG. 20 shows details of one stage of the PN code generator. The stage includes, e.g., 15 shift registers, one XOR gate and a digital clock C. Two outputs tapped from, for example, the fourth and the last shift registers are input to the XOR gate, and an output of the gate is fed back to an input of the stage. An exemplary PN modulation coding sequence output by the stage at point (a) in FIG. 19 is shown at the bottom of FIG. 20, wherein the sequence is used to modulate the phase of the transmitted pulses.

| | | | | | | | | Polar PN | | | | | | | |
|---|---|---|---|---|---|---|---|---|---|---|---|---|---|---|---|
| H | H | H | H | V | V | V | V | H | H | H | H | V | V | V | V |
| | | | | | | | Mod PN | | | | | | | | |
| 1 | 1 | -1 | -1 | 1 | 1 | 1 | -1 | 1 | -1 | -1 | 1 | -1 | -1 | -1 | 1 |
| Noise 0.0 | 0.0 | 0.0 | 0.0 | 0.0 | -0.1 | -0.1 | 0.0 | 0.1 | 0.1 | -0.1 | 0.0 | 0.0 | 0.0 | -0.1 | 0.0 |
| Cable Echo 1 | 1 | -1 | -1 | 0 | 0 | 0 | 0 | 1 | -1 | -1 | 1 | 0 | 0 | 0 | 0 |
| Gnd 0 | 0 | 0 | 0 | 1 | 1 | 1 | -1 | 0 | 0 | 0 | 0 | -1 | -1 | -1 | 1 |
| Total Echo 1.0 | 1.0 | -1.0 | -1.0 | 1.0 | 0.9 | 0.9 | -1.0 | 1.1 | -0.9 | -1.1 | 1.0 | -1.0 | -1.0 | -1.1 | 1.0 |

Figure 21:
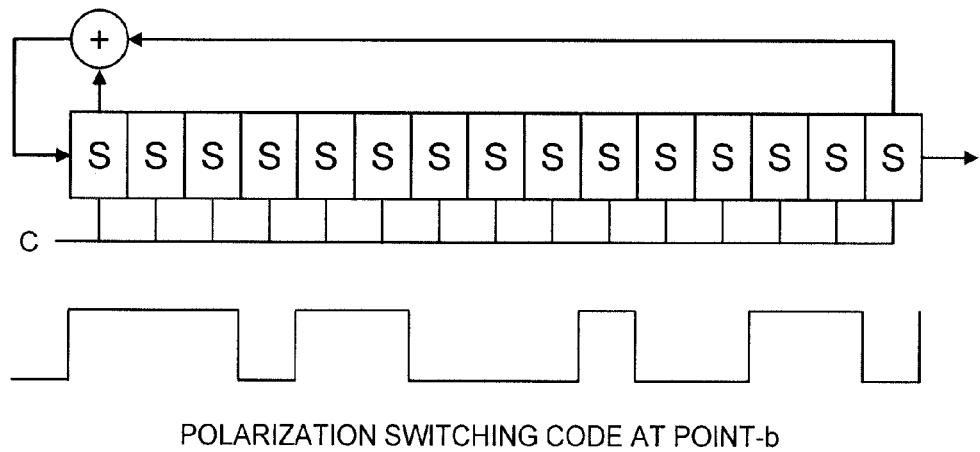
FIG. 21 shows another stage of a PN code generator in the system of FIG. 19.

Correlation results obtained for the above sequence are as follows:

FIG. 21 shows another stage of the PN generator in FIG. 19. The stage includes, e.g., 15 shift registers with one XOR

| | | | | | | | | | | | | | | | | Det |
|---|---|---|---|---|---|---|---|---|---|---|---|---|---|---|---|---|
| Total Echo | 1.0 | 1.1 | -1.0 | -1.0 | 1.0 | 1.1 | 1.0 | -0.9 | 0.9 | -0.9 | -1.0 | 0.9 | -1.1 | -1.1 | -1.0 | 1.0 |
| Cable PN | 1 | 1 | -1 | -1 | 0 | 0 | 0 | 0 | 1 | -1 | -1 | 1 | 0 | 0 | 0 | 0 |
| Gnd PN | 0 | 0 | 0 | 0 | 1 | 1 | 1 | -1 | 0 | 0 | 0 | 0 | -1 | -1 | -1 | 1 |
| Rcg | 0 | 0 | 0 | 0 | 0 | 0 | 0 | 0 | 0 | 0 | 0 | 0 | 0 | 0 | 0 | 0.0 |
| Rct | 1.0 | 1.1 | 1.0 | 1.0 | 0.0 | 0.0 | 0.0 | 0.0 | 0.9 | 0.9 | 1.0 | 0.9 | 0.0 | 0.0 | 0.0 | 1.0 |
| Rgt | 0.0 | 0.0 | 0.0 | 0.0 | 1.0 | 1.1 | 1.0 | 0.9 | 0.0 | 0.0 | 0.0 | 0.0 | 1.1 | 1.1 | 1.0 | 1.0 |

From the foregoing, it is noted that the intensity of the cable echo can be obtained if the coding contains a polarization sequence. The obtained intensity is highly reliable even if ground clutter exists together with the cable echo. The received wave is correlated with altered coding echo signals, and the correlated signal does not include ground clutter but rather is a signal due to the target cable. The cable can therefore be detected with high reliability notwithstanding strong terrain clutter. That is, even if ground clutter exists together with a cable echo, signals whose amplitude corresponds only to the intensity of the cable echo may be obtained.

gate and a digital clock C. Two outputs tapped from, for example, the first and the last shift registers are input to the XOR gate, and an output of the gate is fed back to an input of the stage. An exemplary PN polarization control sequence output by the stage at point (b) to drive the polarization switch POL in FIG. 19, is shown at the bottom of FIG. 21.

The stages in FIGS. 20 and 21 are so-called M-type generators, and have bi-polar outputs (+1 or -1). Other types of PN generators can be used as long as the code sequence is balanced. For example, a 7-shift maximum generator with two XOR gates may also be used.

Figure 22:
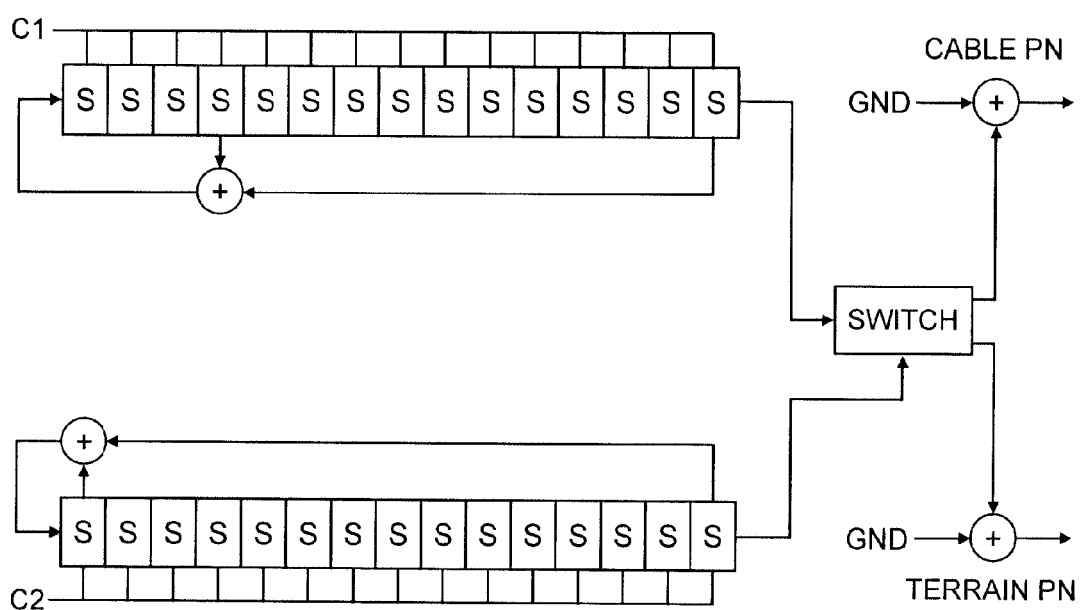
FIG. 22 shows a configuration of the stages of FIGS. 20 and 21 for generating terrain clutter and cable PN codes for input to a correlator in the system of FIG. 19.

FIG. 22 shows a block (k) within the PN code generator in FIG. 19. The output of the modulation code generator in FIG. 20 is applied to an input of a single pole double throw switch. The switch operation is controlled by an output of the polarization code generator in FIG. 21, so that when the output is high (+1), the switch connects the output of the modulation code generator through a sum circuit to a cable PN input (g) of the correlator in FIG. 19. The sum circuit has another input connected to ground (or "0") so that when the output of the modulation code generator is disconnected by the switch, the cable PN input to the correlator is effectively grounded. When the output of the polarization code generator is low (−1), the switch connects the output of the modulation code generator through a second sum circuit to a terrain PN input (h) of the correlator in FIG. 19. The second sum circuit also has another input that is grounded.

Figure 23:
FIGS. 23 and 24 are waveforms of the terrain clutter and the cable codes.
Figure 24:

FIG. 23 is an example of a system receiver (RX) clutter code for the correlator at point (g) in FIG. 19, and FIG. 24 is an example of a RX clutter code for the correlator at point (h).

FIGS. 25 to 30 show signal waveforms at various points in the system of FIG. 19. For simplicity, only signals corresponding to one pulse transmitted by the system, and whose corresponding echo is received by the system, are shown.

Figure 25:
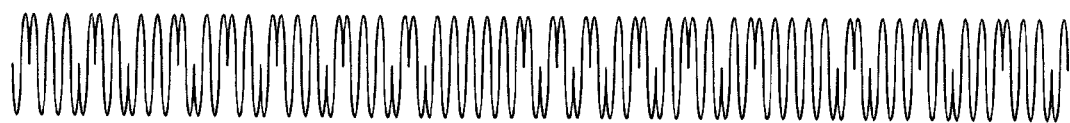
FIG. 25 shows a PN modulated carrier of a pulse transmitted by the system of FIG. 19.
Figure 26:
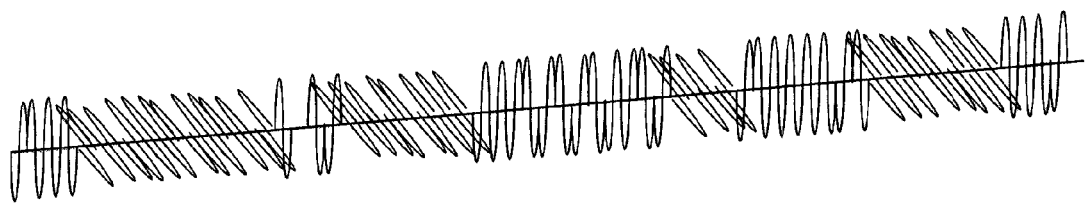
FIG. 26 shows a waveform including the polarization of the pulse as radiated from a transmit antenna of the system.

FIG. 25 is an example of a microwave RF carrier forming the transmitted pulse, wherein the pulse is phase modulated by the modulation coding sequence at point (a) in FIG. 19. The carrier frequency is constant for each transmitted pulse, and the coding sequence is binary phase shift keyed (BPSK) onto the carrier. Other modulation methods may also be applied when needed. FIG. 26 shows the application of both of the phase modulation and the polarization coding sequences on the pulse waves radiated from the transmitting antenna. Assume the pulse intercepts a target cable and its adjacent terrain.

Figure 27:
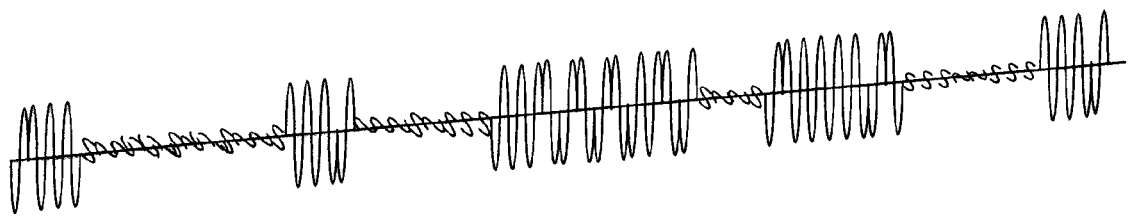
FIG. 27 shows a waveform of a signal returned to a receive antenna of the system, including terrain clutter and real cable echoes attributable to the transmitted pulse.

Signals reflected by the cable and the terrain combine and return to the receiving antenna for detection by the system receiver. FIG. 27 is an example of the waveform of a reflected signal attributable to the transmitted pulse. It is readily seen in FIG. 27 that the power of the ground clutter component in the returned signal wave, i.e., the component having a vertical polarization, is greater than the wave component corresponding to the cable, i.e., the component having a horizontal polarization.

Figure 28:
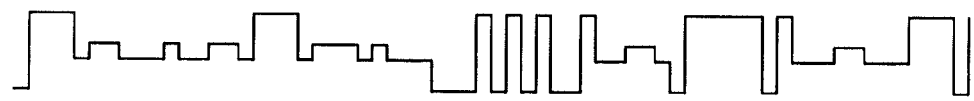
FIG. 28 is a baseband signal detected from the returned signal in FIG. 27.
Figure 29:
FIG. 29 is a waveform of a terrain correlation output by the correlator in the system of FIG. 19.
Figure 30:
FIG. 30 is a waveform of a cable correlatin output by the correlator.

FIG. 28 shows the waveform of a baseband signal obtained from the return signal at point (f) in FIG. 19, after down-converting the signal by operation of the LO and the mixer associated with the LNA. The baseband signal is applied to the correlator to which the RX clutter code (FIG. 23) and the RX cable code (FIG. 24) are also input at (g) and (h). FIG. 29 shows an exemplary terrain correlation output from the correlator at point (i) in FIG. 19, and FIG. 30 shows an example of a cable correlation output from the correlator at point (j). Terrain clutter is effectively removed from the cable correlation output, leaving a well defined peak representing a target cable.

It will be understood that the radial speed toward a target cable may also be obtained in real time by measuring a phase difference between successive peaks in the cable correlation output. This Doppler velocity may be indicated on the A-scope display together with the correlation peak.

Figure 31:
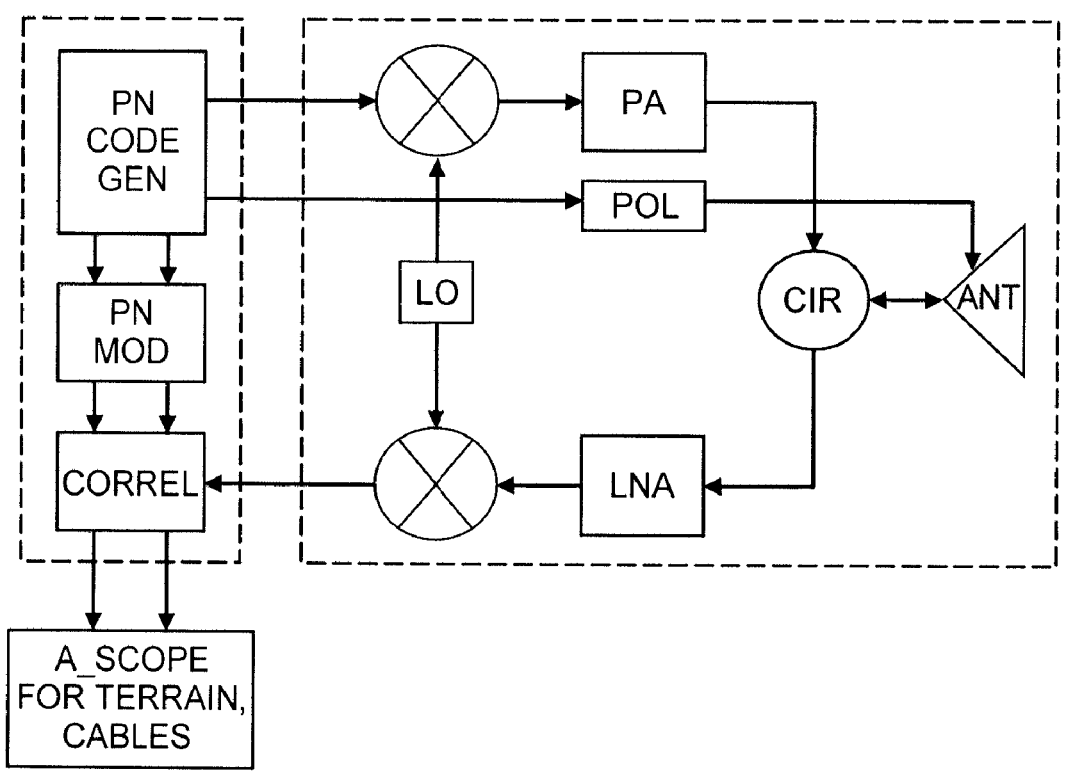
FIG. 31 is a block diagram of a second embodiment of a radar cable detection system according to the invention.

FIG. 31 is a block diagram of another embodiment of the inventive system. In FIG. 31, the transmitter PA and the receiver LNA share a common antenna aperture. For close-in range operation, transmitted pulse signals may be isolated from received signals in a known manner using a circulator as shown. The circulator operates to protect the LNA from damage due to RF overload. For long range operation, the transmitted pulses are also separated from the received signals by their relative timing. Other processing aspects of the system in FIG. 31 may be the same as in the system of FIG. 19, and cable location and approaching speed may be obtained in real time by the use of such indicators as described above.

Detection Range

The detection range of the inventive system depends, inter alia, on antenna beamwidth and the altitude of the aircraft in which the system is deployed. The range is generally equal to the distance at which the cone of the antenna beam impinges the ground. For example, using a five-degree antenna beamwidth and a peak RF pulse power of only one watt, the system will detect a power line cable at up to 1 km distance when the aircraft is 100 feet above ground, i.e., a typical height for both helicopters and high voltage power transmission lines. A three-degree antenna beamwidth was found to cover a distance of up to 2 km. To protect a helicopter against collisions with cables that run parallel to but gradually merge with its flight path, the beam of the transmitting antenna is preferably aimed periodically sideways so that transmitted pulses will approach the cables from a broadside direction to induce maximum return signals.

Aircraft pitch and roll angle information are preferably input to the system and used to keep the antenna beam level. The system may also use a detected radar altitude to project the distance to a ground intercept point, and filter out ground clutter signals received from beyond the intercept point. This will increase the SNR of echoes received from target cables, and also reduce the rate at which false targets are detected.

The inventive system may operate with a duty cycle of, for example, five percent. During the active part of the cycle, the system hops in frequency and spreads the frequencies of the transmitted pulse signals using the above described PN sequences. Thus, the system is a frequency hopping direct sequence (FHDS) spread spectrum system.

It will be appreciated that the inventive system can save lives and avoid extensive property damage. The system improves mission effectiveness by allowing pilots to fly faster, lower and safer, and can make otherwise hazardous missions such as rescue, oil rig maintenance or military extractions, safer.

Locations of detected hazards may be distributed via the system to other platforms in real time, thus enabling platforms not equipped with the system to avoid hazardous areas, as well as increasing the detection reliability of platforms where the system is incorporated. The locations of detected hazards may also be uploaded to a networked database which can be accessed by any aircraft In the network.

While the present invention has been described in connection with the disclosed embodiments, it will be understood that other, similar embodiments may be used or modifications or additions may be made in order to carry out the same or similar functions performed by the invention.

For example, the inventive system may be combined with an existing low probability of intercept radar altimeter, with appropriate software and hardware modifications being made to the altimeter. A forward looking transmit/receive antenna array may be mounted on a helicopter or other aircraft for cable detection, and the array coupled to an RF port of the altimeter through an up/down frequency converter. This will allow pulses at a carrier frequency of, e.g., about 34 GHz to be transmitted and received by the array to obtain a fine detection resolution, and the pulses may be processed within the altimeter whose typical operating frequency is only about 4 GHz.

Therefore, the present invention should not be limited to any single embodiment, but rather construed in breadth and scope in accordance with the appended claims.

The invention claimed is:

1. A process for separating ground clutter from signals echoed by a cable in the flight path of an aircraft having a radar system, comprising:
encoding a transmitted pulse wave in the radar system with at least one transmit (TX) coding sequence, so that received signals echoed by a cable on which the pulse is incident and associated ground clutter are orthogonal or separable from one another;
altering the TX coding sequence into two receive (RX) coding sequences one of which corresponds to the cable and the other to the ground clutter; and
correlating the two RX coding sequences with the received signals, thereby separating received signals echoed by the cable from the associated ground clutter.

2. The process of claim 1, including modulating the transmitted pulse wave according to a first TX coding sequence.

3. The process of claim 2, wherein the modulating step includes changing the phase of the transmitted pulse wave.

4. The process of claim 1, including switching the polarization of the transmitted pulse wave between horizontal and vertical according to a second TX coding sequence.

5. The process of claim 1, including modulating the transmitted pulse wave according to a first TX coding sequence, and switching the polarization of the transmitted pulse wave between horizontal and vertical according to a second TX coding sequence.

6. The process of claim 3, wherein the second TX coding sequence switches the polarization of the transmitted pulse wave so that the wave is coded to spread over the duration of the pulse, and received signals echoed by a cable on which the wave is incident have a different polarization spread than the associated ground clutter.

7. The process of claim 1, including extracting non-stationary structure in an echo correlation vector produced in the radar system to correspond with a target cable, and subtracting the non-stationary structure from the echo correlation vector, thereby improving a signal-to-noise ratio (SNR) for detection of a target cable having a relatively low radar cross section (RCS).

8. The process of claim 6, wherein the extracting step is performed by using a running median with adaptation on end bins.

9. The process of claim 1, including determining an approaching speed of a target cable according to received signals echoed by the cable.

10. The process of claim 1, including reducing false target detections by introducing a random time jitter between successive ones of the transmitted pulse waves.

11. The process of claim 1, including providing a radar altimeter as the radar system in the aircraft, mounting a forward looking antenna array on the aircraft, and coupling the antenna array to a RF port of the radar altimeter.

12. The process of claim 11, including coupling the antenna array to the radar altimeter through an up/down converter.

13. The process of claim 1, including radiating the transmitted pulse wave via a forward looking transmit antenna on the aircraft.

14. The process of claim 1, including receiving the signals echoed by a cable and the associated ground clutter via a forward looking receive antenna on the aircraft.

15. The process of claim 1, including radiating the transmitted pulse wave via a common forward looking system antenna on the aircraft, receiving the signals echoed by a cable and the associated ground clutter via the common system antenna, and isolating successive transmitted pulse waves and the received signals from one another.

* * * * *